(12) United States Patent
Takahashi et al.

(10) Patent No.: US 9,236,602 B2
(45) Date of Patent: Jan. 12, 2016

(54) POSITIVE ELECTRODE ACTIVE MATERIAL FOR SECONDARY BATTERY AND SECONDARY BATTERY USING THE SAME

(71) Applicant: NEC Corporation, Tokyo (JP)

(72) Inventors: Makiko Takahashi, Tokyo (JP); Takehiro Noguchi, Tokyo (JP); Hideaki Sasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/391,742

(22) PCT Filed: Oct. 12, 2012

(86) PCT No.: PCT/JP2012/076547
§ 371 (c)(1),
(2) Date: Oct. 10, 2014

(87) PCT Pub. No.: WO2013/153690
PCT Pub. Date: Oct. 17, 2013

(65) Prior Publication Data
US 2015/0108396 A1    Apr. 23, 2015

(30) Foreign Application Priority Data
Apr. 13, 2012  (JP) .................................. 2012-092044

(51) Int. Cl.
*H01M 4/485* (2010.01)
*H01M 4/131* (2010.01)
(Continued)

(52) U.S. Cl.
CPC .............. *H01M 4/131* (2013.01); *C01G 53/54* (2013.01); *H01M 4/485* (2013.01); *H01M 4/505* (2013.01);
(Continued)

(58) Field of Classification Search
CPC ....... H01M 4/131; H01M 4/48; H01M 4/485; H01M 4/505; H01M 4/525; H01M 4/383; H01B 1/22

USPC .................. 252/182.1; 429/218.1, 231.95
See application file for complete search history.

(56) References Cited

U.S. PATENT DOCUMENTS

| 7,179,566 B2 * | 2/2007 | Kawasaki et al. ........ 429/231.95 |
| 2003/0086863 A1 | 5/2003 | Noguchi et al. |
| 2012/0015231 A1 * | 1/2012 | Takamori et al. ..... H01M 4/485 429/144 |

FOREIGN PATENT DOCUMENTS

| JP | 3-108261 | 5/1991 |
| JP | 4-282560 | 10/1992 |

(Continued)

OTHER PUBLICATIONS

S. Rajakumar et al., "Electrochemical Behavior of $LiM_{0.25}Ni_{0.25}Mn_{1.5}O_4$ as 5 V Cathode Materials for Lithium Rechargeable Batteries", Journal of the Electrochemical Society, vol. 156, pp. A246-A252, 2009.

(Continued)

*Primary Examiner* — Khanh Tuan Nguyen
*Assistant Examiner* — Haidung Nguyen
(74) *Attorney, Agent, or Firm* — Finnegan, Henderson, Farabow, Garrett & Dunner LLP

(57) ABSTRACT

Provided are a positive electrode active material for a lithium ion secondary battery and a secondary battery using the same, by which high discharge energy is obtained at low cost and capacity drop with cycles can be suppressed. A positive electrode active material for a secondary battery according to the embodiment of the present invention is represented by the following formula (I):

$$Li_a(Fe_xNi_yMn_{2-x-y-z}A_z)O_4 \quad (I)$$

wherein $0.2 < x \le 1.2$, $0 < y < 0.5$, $0 \le a \le 1.2$ and $0 < z \le 0.3$; A is at least one selected from the group consisting of Li, B, Na, Mg, Al, K and Ca.

19 Claims, 1 Drawing Sheet

(51) Int. Cl.
*H01M 4/505* (2010.01)
*H01M 4/525* (2010.01)
*C01G 53/00* (2006.01)
*H01M 4/48* (2010.01)
*H01M 10/0525* (2010.01)

(52) U.S. Cl.
CPC ........... *H01M 4/525* (2013.01); *C01P 2002/52* (2013.01); *C01P 2006/12* (2013.01); *H01M 4/48* (2013.01); *H01M 10/0525* (2013.01); *Y02E 60/122* (2013.01)

(56) References Cited

FOREIGN PATENT DOCUMENTS

| | | |
|---|---|---|
| JP | 4-289662 | 10/1992 |
| JP | 8-17423 | 1/1996 |
| JP | 9-147867 | 6/1997 |
| JP | 2000-90923 | 3/2000 |
| JP | 2000-235857 | 8/2000 |
| JP | 2002-42814 | 2/2002 |
| JP | 2002-158008 | 5/2002 |
| JP | 2003-197194 | 7/2003 |
| JP | 2009-176583 | 8/2009 |
| JP | 2010-97845 | 4/2010 |
| WO | WO 2012/014793 A1 | 2/2012 |

OTHER PUBLICATIONS

R. Alcantara et al., "Synergistic Effects of Double Substitution in $LiNi_{0.5-y}Fe_yMn_{1.5}O_4$ Spinel as 5 V Cathode Materials", Journal of the Electrochemical Society, vol. 152, pp. A13-A18, 2005.

T. Ohzuku et al., "Solid-state redox potentials for $Li[Me_{1/2}Mn_{3/2}]O_4$ (Me: 3d-transition metal) having spinel-framework structures: a series of 5 volt materials for advanced lithium-ion batteries", Journal of Power Sources 81-82, pp. 90-94, 1999.

H. Kawai et al., "High-voltage lithium cathode materials", Journal of Power Sources 81-82, pp. 67-72, 1999.

International Search Report mailed Jan. 8, 2013 in corresponding PCT application.

\* cited by examiner

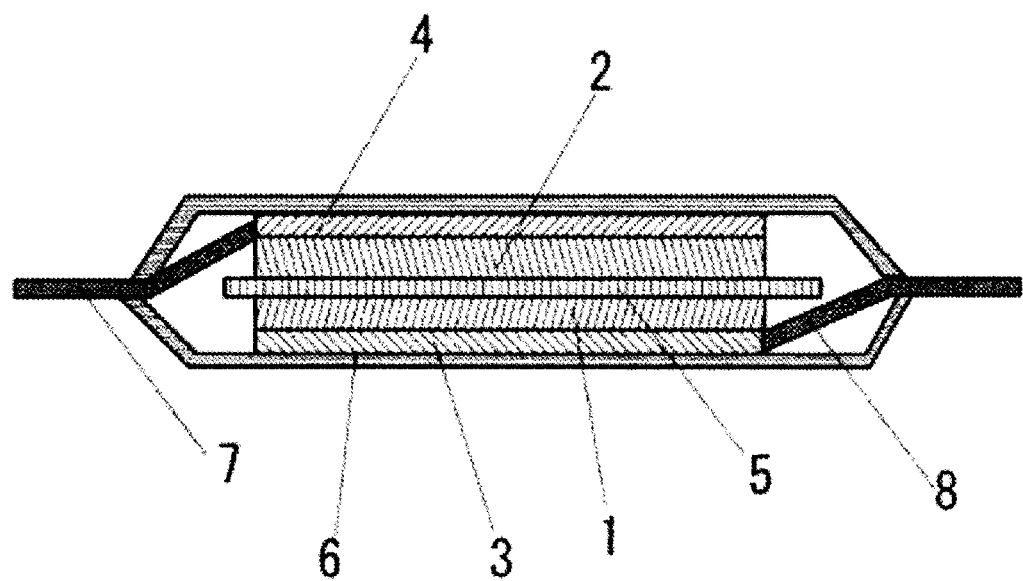

POSITIVE ELECTRODE ACTIVE MATERIAL FOR SECONDARY BATTERY AND SECONDARY BATTERY USING THE SAME

CROSS-REFERENCE TO RELATED PATENT APPLICATIONS

This application is a National Stage Entry of International Application No. PCT/JP2012/076547, filed Oct. 12, 2012, which claims priority from Japanese Patent Application No. 2012-092044, filed Apr. 13, 2012. The entire contents of the above-referenced applications are expressly incorporated herein by reference.

TECHNICAL FIELD

The embodiment of the present invention relates to a positive electrode active material for a lithium secondary battery and a secondary battery using the same.

BACKGROUND ART

Since a lithium ion secondary battery using a nonaqueous electrolytic solution can provide a high voltage, it is characterized by high energy density and widely used as power sources for mobile phones, notebook computers and others. Recently, with tightened $CO_2$ regulation, use of a secondary battery in large-size products such as electric cars has drawn attention. In the circumstances, it has been desired to solve problems of improving safety and life, and reducing cost.

As a positive electrode active material for a lithium ion secondary battery, $LiCoO_2$ is well known. Since $LiCoO_2$ has satisfactory characteristics, it is used in many lithium ion secondary batteries. However, Co, as a raw material of $LiCoO_2$, is expensive and the resource distribution is uneven, and thereby there are problems of many variation factors associated with $LiCoO_2$. Particularly for use in large-size products, since price and constant supply of resource are important for selecting a material, study of an alternate material is indispensable.

Another positive electrode active material includes $LiNiO_2$. Although Ni is a raw material supplied from an abundant resource compared with Co, the price greatly varies due to demand balance. In $LiNiO_2$, trivalent Ni is unstable and likely to change into divalent Ni, with the result that $LiNiO_2$ changes into a non-stoichiometric composition. Furthermore, divalent Ni may possibly invade into a lithium site. For these reasons, it is difficult to control synthesis of $LiNiO_2$. In addition, since $LiNiO_2$ is thermally unstable, it is difficult to ensure safety of a secondary battery.

On the other hand, in view of cost and safety, $LiMn_2O_4$, a lithium manganese composite oxide of a spinel type crystal structure having a three-dimensional lithium diffusion route, is highly expected. A resource for Mn as a raw material for $LiMn_2O_4$ is abundant and relatively inexpensive. Further, since Mn rarely causes thermal decomposition during overcharge and at a high temperature process, Mn is advantageous in view of ensuring safety. However, $LiMn_2O_4$ causes problems such as deterioration with cycles and elution of Mn into an electrolytic solution when $LiMn_2O_4$ is stored at a high temperature. It is conceived that these problems are caused by Jahn-Teller strain of trivalent Mn increased with Li insertion, thereby causing destabilization of the crystal structure, and generating performance deterioration and the like with cycles.

In order to reduce the Jahn-Teller strain, an attempt to substitute trivalent Mn with another element has been made. For example, Patent Literature 1 discloses that a capacity retention ratio during overdischarge can be improved by using a lithium manganese composite oxide having a spinel structure and having a composition represented by formula $Li_xMn_{(2-y)}Al_yO_4$ ($0.85 \leq x \leq 1.15$, $0.02 \leq y \leq 0.5$), in which a part of Mn is substituted with Al, as a positive electrode active material. Furthermore, it has been confirmed that an effect of improving e.g., life is exerted by substitution with Mg and Ca (Patent Literature 2), Ti (Patent Literature 3), Co, Ni, Fe, Cr (Patent Literature 4) and the like.

Further, since a lithium manganese composite oxide is used in a so-called 4 V-level positive electrode having a discharge potential of 4.2 V or less and a small discharge capacity, there is a technical problem in increasing energy density. As a method for improving the energy density of a lithium ion secondary battery, a method of increasing the action potential of a secondary battery is effective. It has been already known that a 5 V-level action potential can be achieved by substituting a part of Mn of $LiMn_2O_4$ with Ni, Co, Fe, Cu, Cr and the like (for example, Patent Literature 5, Non Patent Literature 1, Non Patent Literature 2). These are called as a 5 V-level positive electrode.

Among these, a lithium manganese composite oxide in which a part of Mn site is substituted with Ni exhibits a flat discharge potential and have a high capacity in the region of 4.5 V or more, and thus, it is expected as a high potential positive electrode active material. For example, in the case where a part of Mn site is substituted with Ni, Mn is present in a quadrivalent state. Discharge occurs by the reaction of $Ni^{2+} \rightarrow Ni^{4+}$ instead of the reaction of $Mn^{3+} \rightarrow Mn^{4+}$. Since the reaction of $Ni^{2+} \rightarrow Ni^{4+}$ provides a high potential of about 4.7 V, the lithium manganese composite oxide functions as a high-potential electrode material.

On the other hand, in various industrial fields including the automobile industry, it is expected that the demand for a lithium ion secondary battery will increase. In such circumstance, a lithium manganese composite oxide using Fe as a substitution element is extremely advantageous in view of resource, environment and cost. In the case where a part of Mn site is substituted with Fe, the reaction of $Fe^{3+} \rightarrow Fe^{4+}$ occurs in place of the reaction of $Mn^{3+} \rightarrow Mn^{4+}$. The reaction of $Fe^{3+} \rightarrow Fe^{4+}$ is known to occur at near 4.9 V. A high potential spinel material in which a part of Mn site is substituted with Fe has been already disclosed (Patent Literature 6, Patent Literature 7).

CITATION LIST

Patent Literature

Patent Literature 1: Japanese Patent Laid-Open No. 04-289662
Patent Literature 2: Japanese Patent Laid-Open No. 03-108261
Patent Literature 3: Japanese Patent Laid-Open No. 08-17423
Patent Literature 4: Japanese Patent Laid-Open No. 04-282560
Patent Literature 5: Japanese Patent Laid-Open No. 09-147867
Patent Literature 6: Japanese Patent Laid-Open No. 2000-90923
Patent Literature 7: Japanese Patent Laid-Open No. 2010-97845
Patent Literature 8: Japanese Patent Laid-Open No. 2000-235857
Patent Literature 9: Japanese Patent Laid-Open No. 2002-42814

Patent Literature 10: Japanese Patent Laid-Open No. 2002-158008

Non Patent Literature

Non Patent Literature 1: H. Kawai, et al., Journal of Power Sources, vol. 81-82, pp. 67-72, 1999

Non Patent Literature 2: T. Ohzuku, et al., Journal of Power Sources, vol. 81-82, pp. 90-94, 1999

Non Patent Literature 3: R. Alcantara, et al., Journal of The Electrochemical Society, vol. 152(1), pp. A13-A18, 2005

Non Patent Literature 4: S. Rajakumar, et al., Journal of The Electrochemical Society, vol. 156(3), pp. A246-A252, 2009

SUMMARY OF INVENTION

Technical Problem

In the case where a part of Mn is substituted with Fe, when the composition ratio x of Fe in a composition formula $Li_a(Fe_xMn_{2-x})O_4$ is 1, all of Mn become quadrivalent theoretically. Therefore, owing to the reaction of $Fe^{3+} \rightarrow Fe^{4+}$ at a high potential, an increase of energy density is expected. However, when the composition ratio x of Fe comes closer to 1, the structure is destabilized, and thus synthesis becomes difficult and capacity drop occurs simultaneously. For this reason, also in Patent Literature 6 and Patent Literature 7, if a substitution element is Fe alone, sufficient discharge energy cannot be obtained. In addition, capacity drop occurs with cycles.

While Documents (Patent Literature 8, Patent Literature 9, Patent Literature 10, Non Patent Literature 3, and Non Patent Literature 4) disclose a 5 V-level positive electrode obtained by substituting a part of Mn with various types of elements such as Ni and Fe, the substitution amounts with Fe are quite small, and thus, further improvement is desired for reducing cost. Furthermore, these documents are silent about valence change of Fe. As the substitution amount with Fe increases, the discharge energy reduces and capacity drop occurs with cycles. Furthermore, these documents are silent about cases where a part of Mn is substituted with three types or more of elements.

The object of the embodiment of the present invention is to provide a positive electrode active material for a secondary battery, capable of suppressing capacity drop with cycles at low cost, and a secondary battery using the same.

Solution to Problem

A positive electrode active material for a secondary battery according to the embodiment of the present invention is represented by the following formula (I):

$$Li_a(Fe_xNi_yMn_{2-x-y-z}A_z)O_4 \qquad (I)$$

wherein $0.2 < x \le 1.2$, $0 < y < 0.5$, $0 \le a \le 1.2$ and $0 < z \le 0.3$; A is at least one selected from the group consisting of Li, B, Na, Mg, Al, K and Ca.

Advantageous Effects of Invention

According to the exemplary embodiment, it is possible to realize cost reduction and suppression of capacity drop with charge/discharge cycles.

BRIEF DESCRIPTION OF DRAWINGS

FIG. 1 is a sectional view showing an example of a secondary battery according to an embodiment of the present invention.

DESCRIPTION OF EMBODIMENTS

[Positive Electrode Active Material for Secondary Battery]

A technique for substituting Mn with another element in a 4 V-level positive electrode is disclosed in many reports. However, whereas these disclosures are directed to increasing stability of a crystal structure, the positive electrode active material for a secondary battery according to the embodiment of the present invention is characterized by ensuring an operation at a high potential using valence change of substitution elements, Ni and Fe.

Although Fe is an extremely advantageous material in view of the cost of raw materials and resource, sufficient energy density has not been obtained. In the case of Ni, there are problems in that the cost of raw materials greatly varies, and also in view of extending life because an electrolytic solution is easily decomposed by the catalyst function of Ni. The positive electrode active material for a secondary battery according to the embodiment of the present invention can achieve cost reduction and suppression of capacity drop with cycles by substituting a part of Mn with not only Fe and Ni but also element A.

A positive electrode active material for a secondary battery according to the embodiment of the present invention is represented by the following formula (I):

$$Li_a(Fe_xNi_yMn_{2-x-y-z}A_z)O_4 \qquad (I)$$

wherein $0.2 < x \le 1.2$, $0 < y < 0.5$, $0 \le a \le 1.2$ and $0 < z \le 0.3$; A is at least one selected from the group consisting of Li, B, Na, Mg, Al, K and Ca.

In the formula (I), the composition ratio x of Fe is $0.2 < x \le 1.2$. The case where x is 0.2 or less is not preferable in view of reducing cost and extending life. On the other hand, if x exceeds 1.2, a crystal structure is destabilized and a capacity drop occurs, which is not preferable. In the formula (I), the composition ratio x of Fe is preferably $0.2 < x \le 1.0$, more preferably $0.2 < x \le 0.6$, and further preferably $0.25 \le x \le 0.4$.

In the formula (I), the composition ratio y of Ni is $0 < y < 0.5$. The case where $y=0$, which means that Ni is not contained, is not preferable in view of increasing capacity. On the other hand, the case where y is 0.5 or more is not preferable in view of extending life. In the formula (I), composition ratio y of Ni is preferably $0 < y \le 0.4$, more preferably $0 < y \le 0.3$, and further preferably $0.1 \le y \le 0.3$.

Fe, a substitution element for Mn, is preferably trivalent in a discharge state and Ni is preferably divalent. When Mn is substituted with Fe, in the case where the composition ratio x of Fe is 1 in the formula (I), all of Mn are quadrivalent. In contrast, when Mn is substituted with Ni, in the case where the composition ratio y of Ni is 0.5, all of Mn are quadrivalent. In the embodiment of the present invention, since Mn is substituted with both of Fe and Ni, it is preferable to satisfy $x+2y=1$ in the formula (I). However, when the total substitution amount of Fe and Ni increases, cation mixing of Li and transition metal elements is likely to occur and single phase spinel is less likely obtained, and consequently capacity drop sometimes may occur. For this reason, the sum of substitution amounts of Fe and Ni is preferably $0 < x+y \le 0.7$, more preferably $0 < x+y < 0.7$, further preferably $0.4 \le x+y < 0.7$, and particularly preferably $0.5 \le x+y \le 0.6$.

In the formula (I), the composition ratio a of Li is $0 \leq a \leq 1.2$. The composition ratio a of Li preferably is $0.8 \leq a \leq 1.1$.

In the positive electrode active material for a secondary battery according to the embodiment of the present invention, a part of Mn is substituted with element A. Element A is a metal having monovalence to trivalence and at least one metal selected from the group consisting of Li, B, Na, Mg, Al, K and Ca, which are lighter than Mn. Owing to introduction of element A, a high action potential is achieved by preventing valence change of Mn, and weight reduction of an electrode and suppression of capacity drop with cycles can be also attained. The reason why an effect of suppressing capacity drop with cycles can be obtained is presumed that a crystal structure can be more stabilized by substituting Mn with element A. Element A is preferably at least one selected from the group consisting of Li, Mg and Al. In the formula (I), the composition ratio z of element A is $0 < z \leq 0.3$. The composition ratio z of element A is preferably $0.01 \leq z \leq 0.2$.

The positive electrode active material for a secondary battery according to the embodiment of the present invention preferably has a region in which charge-discharge is caused due to valence change between trivalence and quadrivalence of Fe. The valence change between trivalence and quadrivalence of Fe occurs at 4.8 V or more versus a lithium reference potential. In addition, whether the charge-discharge region is present or not can be determined by the discharge curve of a secondary battery using a target positive electrode active material.

The specific surface area of the positive electrode active material for a secondary battery according to the embodiment of the present invention is preferably 0.01 m$^2$/g or more and 3 m$^2$/g or less, and more preferably 0.05 m$^2$/g or more and 1 m$^2$/g or less. If the specific surface area is 3 m$^2$/g or less, a large amount of binder is not required in preparing a positive electrode and it is advantageous in view of the capacity density of a positive electrode. In addition, the value of the specific surface area refers to a value measured by the BET method.

Although examples of the raw material of the positive electrode active material for a secondary battery according to the embodiment of the present invention are not particularly limited, as a Li raw material, for example, $Li_2CO_3$, LiOH, $Li_2O$ and $Li_2SO_4$ and the like may be used. Among these, $Li_2CO_3$ and LiOH are preferable. As a Mn raw material, various Mn oxides such as electrolyzed manganese dioxide (EMD), $Mn_2O_3$, $Mn_3O_4$ and CMD (chemical manganese dioxide), $MnCO_3$, $MnSO_4$ and others may be used. As a Fe raw material, $Fe_2O_3$, $Fe_3O_4$, $Fe(OH)_2$, FeOOH and others may be used. As a Ni raw material, NiO, Ni(OH), $NiSO_4$, $Ni(NO_3)_2$ and others can be used. As a raw material of element A, an oxide, a carbonate, a hydroxide, sulfide, nitrate of element A and others can be used. These may be used alone or in combination of two types or more.

These raw materials are weighed so as to satisfy a desired metal composition ratio and mixed. Mixing can be conducted by pulverizing and blending using a ball mill, a jet mill and others. The obtained powder mixture is baked at a temperature from 400° C. to 1200° C. in air or oxygen to obtain a lithium manganese composite oxide serving as a positive electrode active material. A higher baking temperature is preferable for diffusing each element. On the other hand, if the baking temperature is excessively high, oxygen deficiency may occur and battery characteristics may possibly deteriorate. For this reason, the baking temperature is preferably 450° C. to 1000° C. In addition, the composition ratio of each element in the formula (I) is a value calculated from the supply amount of raw material of each element.

[Positive Electrode for Secondary Battery]

A positive electrode for the secondary battery according to the embodiment of the present invention has the positive electrode active material for a secondary battery according to the embodiment of the present invention. The positive electrode for a secondary battery according to the embodiment of the present invention can be prepared, for example, by the following method. The positive electrode active material according to the embodiment of the present invention is mixed with a conductivity imparting agent, and further with a binder. The mixture is then applied onto a collector.

As the conductivity imparting agent, not only a carbon material such as acetylene black, carbon black, fibrous carbon and graphite but also a metal substance such as Al, a conductive oxide powder and the like can be used. As the binder, polyvinylidene fluoride (PVDF) and others can be used. As the collector, a metal thin film mainly formed of Al and others can be used.

The addition amount of conductivity imparting agent is preferably 1 to 10 mass % relative to the positive electrode active material. If the addition amount of conductivity imparting agent is set at 1 mass % or more, sufficient conductivity can be obtained. Furthermore, if the addition amount of conductivity imparting agent is set at 10 mass % or less, the content of the positive electrode active material increases and thus capacity per mass can be increased.

The addition amount of binder is preferably 1 to 10 mass % relative to the positive electrode active material. If the addition amount of binder is set at 1 mass % or more, peeling off of an electrode can be suppressed. Furthermore, if the addition amount of binder is set at 10 mass % or less, the content of positive electrode active material increases and thus, capacity per mass can be increased.

[Secondary Battery]

A secondary battery according to the embodiment of the present invention has the positive electrode for the secondary battery according to the embodiment of the present invention.

(Constitution of Secondary Battery)

A secondary battery according to the embodiment of the present invention has the positive electrode for a secondary battery according to the embodiment of the present invention, an electrolytic solution and a negative electrode arranged so as to face with the positive electrode with the electrolytic solution interposed therebetween. More specifically, the secondary battery according to the embodiment of the present invention can include, for example, the positive electrode for the secondary battery according to the embodiment of the present invention, the negative electrode containing a negative-electrode active material capable of intercalating and deintercalating lithium, a separator interposed between the positive electrode and the negative electrode and preventing electrical contact between the positive electrode and the negative electrode, and a lithium ion-conductive electrolytic solution in which the positive electrode, the negative electrode and the separator are to be immersed. These can be sealed in a battery case.

Although the shape of the secondary battery according to the embodiment of the present invention is not particularly limited, for example, a roll type structure formed by rolling a construct in which a positive electrode faces a negative electrode with a separator sandwiched therebetween, a laminate type structure formed by laminating a construct in which a positive electrode faces a negative electrode with a separator sandwiched therebetween, and others can be used. As a cell, a coin-form and a laminate package can be used. As the shape of the cell, a rectangular cell, a cylindrical cell and others can be used.

FIG. 1 shows a laminate type secondary battery as an example of a secondary battery according to the embodiment of the present invention. A separator 5 is sandwiched between the positive electrode consisting of a positive electrode active material layer 1 containing the positive electrode active material according to the embodiment of the present invention and a positive electrode collector 3, and the negative electrode consisting of a negative electrode active material layer 2 and a negative electrode collector 4. The positive electrode collector 3 is connected to a positive electrode lead terminal 8, and the negative electrode collector 4 is connected to a negative electrode lead terminal 7. As an outer package, an outer-package laminate 6 is used. The interior portion of the secondary battery is filled with an electrolytic solution.

(Electrolytic Solution)

As the electrolytic solution, a solution prepared by dissolving a lithium salt as an electrolyte in a solvent can be used. Examples of the solvent include a protonic organic solvents including cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethylmethyl carbonate (EMC) and dipropyl carbonate (DPC); aliphatic carboxylic acid esters such as methyl formate, methyl acetate and ethyl propionate; γ-lactones such as γ-butyrolactone; linear ethers such as 1,2-diethoxyethane (DEE) and ethoxymethoxyethane (EME); cyclic ethers such as tetrahydrofuran and 2-methyltetrahydrofuran; dimethylsulfoxide, 1,3-dioxolane, formamide, acetamide, dimethylformamide, acetonitrile, propylnitrile, nitromethane, ethylmonoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, N-methylpyrrolidone and a fluorinated carboxylic acid ester. These can be used alone or as a mixture of two or more. Among these, propylene carbonate, ethylene carbonate, γ-butyrolactone, dimethyl carbonate, diethyl carbonate and ethylmethyl carbonate are preferably used, alone or as a mixture.

Examples of the lithium salt include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, a lithium lower aliphatic carboxylate, lithium chloroborane, lithium tetraphenylborate, LiBr, LiI, LiSCN, LiCl and imides. These can be used alone or as a mixture of two or more types.

The electrolyte concentration of the electrolytic solution may be set, for example, 0.5 mol/l to 1.5 mol/l. If the electrolyte concentration is 1.5 mol/l or less, increases of the density and viscosity of the electrolytic solution can be suppressed. On the other hand, if the electrolyte concentration is 0.5 mol/l or more, a sufficient electric conductivity of the electrolytic solution can be obtained. A polymer electrolyte may be used in place of the electrolytic solution.

(Negative Electrode)

The negative electrode can be prepared, for example, by the following method. The negative-electrode active material is mixed with a conductivity imparting agent, and further, a binder is mixed thereto. The mixture is applied onto a collector.

As the negative-electrode active material, a material capable of intercalating and deintercalating lithium including carbon materials such as graphite, hard carbon and soft carbon; and Li metals, Si, Sn, Al, SiO, SnO, $Li_4Ti_5O_{12}$ and the like can be used alone or as a mixture. As the conductivity imparting agent, carbon materials such as acetylene black, carbon black, fibrous carbon and graphite can be used, and also a conductive oxide powder and others can be used. As the binder, polyvinylidene fluoride (PVDF) and the like can be used. As the collector, metal foils mainly formed of Al, Cu and the like can be used.

(Method for Preparing Secondary Battery)

The secondary battery according to the embodiment of the present invention can be prepared under a dry air or inert gas atmosphere, for example, by stacking the positive electrode for the secondary battery according to the embodiment of the present invention and a negative electrode with a separator interposed therebetween to form a laminate body, and then housing the laminate body in a battery can. Or otherwise, the secondary battery may be prepared by sealing the laminate body with a flexible film in which a synthesis resin and a metal foil are laminated and the like. A rolled laminate can be used in place of the laminate body.

EXAMPLES

Examples of the embodiment of the present inventions will be described in details below.

Example 1

As raw materials for a positive electrode active material, $MnO_2$, $Fe_2O_3$, NiO, and $Li_2CO_3$; and $B_2O_3$ as a raw material for B, CaO as a raw material for Ca, $K_2O$ as a raw material for K, MgO as a raw material for Mg, $Na_2O$ as a raw material for Na, and $Al_2O_3$ as a raw material for Al were weighed so as to satisfy the metal composition ratio shown in Table 1, pulverized and mixed. The raw material mixed powder was baked at 800° C. for 8 hours to prepare a positive electrode active material.

(Evaluation of Discharge Capacity and Average Discharge Voltage)

The prepared positive electrode active material and carbon (trade name: VGCF, manufactured by Showa Denko K. K.) as a conductivity imparting agent were mixed, and dispersed in a solution in which polyvinylidene fluoride (PVDF) as a binder was dissolved into N-methylpyrrolidone to obtain a slurry. The mass ratio of the positive electrode active material, the conductivity imparting agent and the binder was set at 92/4/4. The slurry was applied onto an Al collector. Thereafter, the slurry was dried in vacuum for 12 hours to obtain an electrode material. A circle having a diameter of 12 mm was cut out from the electrode material, compressed and molded at 3 t/cm$^2$. In this manner, a positive electrode was prepared. As the negative electrode, a Li metal foil was used. As the separator, a polypropylene (PP) film was used. The positive electrode and negative electrode were arranged so as to face each other with the separator interposed therebetween and then placed within a laminate cell. The cell was filled with an electrolytic solution and sealed. As the electrolytic solution, a solution prepared by dissolving an electrolyte $LiPF_6$ in a solvent of EC/DMC=4/6 (vol.%) in a concentration of 1 mol/l was used.

The secondary battery prepared in the aforementioned manner was evaluated for battery characteristics. In evaluation, the battery was charged at a charge rate of 0.1 C up to 5.2 V and discharged at a rate of 0.1 C up to 3 V. Table 1 shows discharge capacity, average discharge voltage versus lithium metal and discharge energy per positive electrode active material by mass versus the potential of lithium metal.

(Evaluation of Cycle Characteristics)

Using the positive electrode, cycle characteristics were evaluated. A negative electrode was prepared as follows. To graphite as a negative-electrode active material, carbon (trade name: VGCF, manufactured by Showa Denko K. K.) as a conductivity imparting agent was added. This mixture was dispersed in a solution in which polyvinylidene fluoride (PVDF) was dissolved into N-methylpyrrolidone to obtain slurry. The mass ratio of the negative-electrode active material, the conductivity imparting agent and the binder was set to 90/1/9. The slurry was applied onto a Cu collector. Thereafter, the slurry was dried in vacuum for 12 hours to obtain an electrode material. A circle having a diameter of 13 mm was cut out from the electrode material, compressed and molded at 1.5 t/cm² to obtain a negative electrode. A PP film was used as the separator. The positive electrode and the negative electrode were arranged so as to face each other with the separator interposed therebetween and then placed within a coin cell. The interior portion of the coin cell was filled with the electrolytic solution and sealed to prepare a secondary battery. As the electrolytic solution, a solution prepared by dissolving an electrolyte $LiPF_6$ in a solvent of EC/DMC=4/6 (vol.%) in a concentration of 1 mol/l was used.

Cycle characteristics were evaluated by charging the battery at a charge rate of 1 C up to 5.1 V in a constant-temperature bath of a temperature of 20° C. and thereafter charged at a constant voltage of 5.1 V. The total charging time was set at 150 minutes. Then, the battery was discharged at a rate of 1 C up to 3 V. This procedure was repeated for 500 cycles. Thereafter, capacity retention ratio was evaluated. The results are shown in Table 1.

Examples 2 to 16, Comparative Examples 1 to 9

Secondary batteries were prepared in the same manner as in Example 1 except that positive electrode active materials having the compositions shown in Table 1 were prepared in the same manner as in Example 1, and evaluated for discharge capacity, average discharge voltage and cycle characteristics. The results are shown in Table 1.

TABLE 1

| | Composition formula | Discharge capacity [mAh/g] | Average discharge voltage [V] | Discharge energy [mWh/g] | Capacity retention ratio after 500 cycles [%] |
|---|---|---|---|---|---|
| Comp-Ex. 1 | $Li(Mn_{1.9}Al_{0.1})O_4$ | 110 | 4.00 | 440 | 75 |
| Comp-Ex. 2 | $Li(Mn_{1.4}Fe_{0.6})O_4$ | 110 | 4.26 | 469 | 48 |
| Comp-Ex. 3 | $Li(Fe_{0.23}Ni_{0.27}Mn_{1.5})O_4$ | 129 | 4.61 | 595 | 64 |
| Comp-Ex. 4 | $Li(Fe_{0.3}Ni_{0.2}Mn_{1.5})O_4$ | 130 | 4.60 | 598 | 64 |
| Comp-Ex. 5 | $Li(Fe_{0.4}Ni_{0.1}Mn_{1.5})O_4$ | 128 | 4.63 | 593 | 63 |
| Comp-Ex. 6 | $Li(Fe_{0.3}Ni_{0.3}Mn_{1.4})O_4$ | 124 | 4.58 | 568 | 62 |
| Comp-Ex. 7 | $Li(Fe_{0.4}Ni_{0.2}Mn_{1.4})O_4$ | 122 | 4.56 | 556 | 61 |
| Comp-Ex. 8 | $Li(Fe_{0.5}Ni_{0.1}Mn_{1.4})O_4$ | 123 | 4.55 | 560 | 61 |
| Comp-Ex. 9 | $Li(Fe_{0.6}Ni_{0.1}Mn_{1.3})O_4$ | 120 | 4.53 | 544 | 59 |
| Ex. 1 | $Li(Fe_{0.35}Ni_{0.15}Li_{0.05}Mn_{1.45})O_4$ | 125 | 4.57 | 571 | 68 |
| Ex. 2 | $Li(Fe_{0.4}Ni_{0.1}Li_{0.05}Mn_{1.45})O_4$ | 125 | 4.62 | 578 | 65 |
| Ex. 3 | $Li(Fe_{0.3}Ni_{0.3}Li_{0.05}Mn_{1.35})O_4$ | 121 | 4.57 | 553 | 65 |
| Ex. 4 | $Li(Fe_{0.35}Ni_{0.15}B_{0.05}Mn_{1.45})O_4$ | 126 | 4.58 | 577 | 67 |
| Ex. 5 | $Li(Fe_{0.35}Ni_{0.15}Ca_{0.05}Mn_{1.45})O_4$ | 123 | 4.59 | 565 | 70 |
| Ex. 6 | $Li(Fe_{0.35}Ni_{0.15}K_{0.05}Mn_{1.45})O_4$ | 121 | 4.62 | 559 | 71 |
| Ex. 7 | $Li(Fe_{0.35}Ni_{0.15}Mg_{0.05}Mn_{1.45})O_4$ | 122 | 4.59 | 560 | 69 |
| Ex. 8 | $Li(Fe_{0.35}Ni_{0.15}Na_{0.05}Mn_{1.45})O_4$ | 121 | 4.58 | 554 | 72 |
| Ex. 9 | $Li(Fe_{0.25}Ni_{0.25}Al_{0.05}Mn_{1.45})O_4$ | 129 | 4.59 | 592 | 70 |
| Ex. 10 | $Li(Fe_{0.35}Ni_{0.15}Al_{0.01}Mn_{1.49})O_4$ | 128 | 4.59 | 588 | 68 |
| Ex. 11 | $Li(Fe_{0.35}Ni_{0.15}Al_{0.05}Mn_{1.45})O_4$ | 124 | 4.61 | 572 | 68 |
| Ex. 12 | $Li(Fe_{0.35}Ni_{0.15}Al_{0.1}Mn_{1.4})O_4$ | 122 | 4.61 | 562 | 70 |
| Ex. 13 | $Li(Fe_{0.35}Ni_{0.15}Al_{0.2}Mn_{1.3})O_4$ | 119 | 4.59 | 546 | 71 |
| Ex. 14 | $Li(Fe_{0.25}Ni_{0.25}Al_{0.05}Mg_{0.05}Mn_{1.4})O_4$ | 122 | 4.58 | 559 | 70 |
| Ex. 15 | $Li(Fe_{0.25}Ni_{0.25}Al_{0.05}Li_{0.05}Mn_{1.4})O_4$ | 120 | 4.57 | 548 | 72 |
| Ex. 16 | $Li(Fe_{0.25}Ni_{0.25}Li_{0.05}Mg_{0.05}Mn_{1.4})O_4$ | 118 | 4.58 | 540 | 74 |

Ex.: Example
Comp-Ex.: Comparative Example

As shown in Table 1, Examples 1 to 16 are the results of the cases where positive electrode active materials having the composition of the formula (I) were used; Comparative Examples 1 and 2 are the results of the cases where the positive electrode active materials in which a part of Mn was substituted only with single element were used; and Comparative Examples 3 to 9 are the results of the cases where positive electrode active materials in which a part of Mn was substituted with two elements were used.

As shown in Examples 1 to 16, it was confirmed that discharge energy increased in the case of the composition of the formula (I) compared to Comparative Examples 1 and 2.

As shown in Examples 1 to 16, it was confirmed that the capacity retention ratio after cycles in the case of the composition of the formula (I) was improved, compared to Comparative Examples 3 to 9. It is presumed that the capacity retention ratio after cycles was improved by the effects of a stabilized crystal structure and suppression of Mn elution and others.

As shown in Examples 10 to 13, it was confirmed that the capacity retention ratio after cycles was improved also in the case where a substitution amount z of element A was changed in the formula (I).

As shown in Examples 1 to 8, it was confirmed that the capacity retention ratio after cycles was improved also in the case where Li, B, Ca, K, Mg or Na was used as element A in the formula (I).

As shown in Examples 14 to 16, it was confirmed that the capacity retention ratio after cycles was improved also in the case where elements of two types or more were used as element A in the formula (I).

Reference Signs List
1 Positive electrode active material layer
2 Negative electrode active material layer
3 Positive electrode collector
4 Negative electrode collector
5 Separator
6 Outer-package laminate
7 Negative electrode lead terminal
8 Positive electrode lead terminal

The invention claimed is:

1. A positive electrode active material for a secondary battery, represented by the following formula (I):

$$Li_a(Fe_xNi_yMn_{2-x-y-z}A_z)O_4 \quad (I)$$

wherein $0.2<x\leq1.2$, $0<y<0.5$, $0\leq a\leq1.2$ and $0<z\leq0.3$; A is at least one selected from the group consisting of Li, B, Na, Mg, Al, K and Ca; and where $0<x+y<0.7$.

2. The positive electrode active material for a secondary battery according to claim 1, wherein x in the formula (I) is $0.2<x\leq0.6$.

3. The positive electrode active material for a secondary according to claim 1, wherein y in the formula (I) is $0<y\leq0.3$.

4. The positive electrode active material for a secondary battery according to claim 1, wherein A in the formula (I) is at least one selected from the group consisting of Li, Mg and Al.

5. The positive electrode active material for a secondary battery according to claim 1, having a charge-discharge region due to valence change of Fe between trivalence and quadrivalence.

6. A positive electrode for a secondary battery comprising the positive electrode active material for a secondary battery according to claim 1.

7. A secondary battery comprising the positive electrode for a secondary battery according to claim 6.

8. A positive electrode for a secondary battery, the positive electrode comprising:
a positive electrode active material represented by the following formula (I):

$$Li_a(Fe_xNi_yMn_{2-x-y-z}A_z)O_4 \quad (I)$$

wherein $0.2<x\leq1.2$, $0<y<0.5$, $0\leq a\leq1.2$ and $0<z\leq0.3$; A is at least one selected from the group consisting of Li, B, Na, Mg, Al, K and Ca; and wherein $0<x+y<0.7$.

9. The positive electrode according to claim 8, wherein x in the formula (I) is $0.2<x\,0,6$.

10. The positive electrode according to claim 8, wherein y in the formula (I) is $0<y<0.3$.

11. The positive electrode according to claim 8, wherein A in the formula (I) is at least one selected from the group consisting of Li, Mg and Al.

12. The positive electrode according to claim 8, wherein the positive electrode active material has a charge-discharge region due to valence change of Fe between trivalence and quadrivalence.

13. The positive electrode according to claim 8, further comprising a conductivity-imparting agent.

14. A secondary battery, comprising:
a positive electrode comprising a positive electrode active material, the positive electrode active material represented by the following formula (I):

$$Li_a(Fe_xNi_yMn_{2-x-y-z}A_z)O_4 \quad (I)$$

wherein $0.2<x\leq1.2$, $0<y<0.5$, $0\leq a\leq1.2$ and $0<z\leq0.3$; A is at least one selected from the group consisting of Li, B, Na, Mg, Al, K and Ca; and where $0<x+y<0.7$.

15. The secondary battery according to claim 14, wherein x in the formula (I) is $0.2<x\,0.6$.

16. The secondary battery according to claim 14, wherein y in the formula (I) is $0<y<0.3$.

17. The secondary battery according to claim 14, wherein A in the formula (I) is at least one selected from the group consisting of Li, Mg and Al.

18. The secondary battery according to claim 14, wherein the positive electrode active material has a charge-discharge region due to valence change of Fe between trivalence and quadrivalence.

19. The secondary battery according to claim 14, wherein the positive electrode comprises a conductivity-imparting agent.

* * * * *

UNITED STATES PATENT AND TRADEMARK OFFICE
CERTIFICATE OF CORRECTION

PATENT NO. : 9,236,602 B2
APPLICATION NO. : 14/391742
DATED : January 12, 2016
INVENTOR(S) : Makiko Takahashi et al.

It is certified that error appears in the above-identified patent and that said Letters Patent is hereby corrected as shown below:

Claims

Claim 8, Col. 12, Line 8, "8," should read as --B,--.

Claim 9, Col. 12, Line 11, "0,6" should read as --0.6--.

Signed and Sealed this
Twenty-sixth Day of April, 2016

Michelle K. Lee
*Director of the United States Patent and Trademark Office*